3,135,658
NON-AQUEOUS OLEAGINOUS AEROSOL FOAM THERAPY OF BOVINE MASTITIS
Edward J. Hanus, Palisade, and Philip A. Ouellette, Rahway, N.J., assignors to Merck & Co., Inc., Rahway, N.J., a corporation of New Jersey
No Drawing. Filed Oct. 10, 1961, Ser. No. 144,060
1 Claim. (Cl. 167—53.2)

This invention relates to medicinal preparations, and has for one of its objects the provision of an improved medicinal preparation containing a propellant for discharging the medicament under pressure into the diseased area. The invention also relates to a method of administering such preparations in the treatment of bovine mastitis. The invention provides a liquid preparation in a container, under pressure, for administering any desired dose or number of doses of the preparation under pressure. More particularly, the invention provides a preparation of steroids, antibiotics or other medicaments in oils, water, or mixtures thereof, the product being packaged under pressure with a propellant, such as an aerosol propellant, which is miscible or forms a suitable dispersion or emulsion with the carrier for the active ingredients.

The preparation is very effective for the treatment of such diseases or ailments as fistulae, wounds, abrasions, surgical incisions and is especially advantageous in the treatment of bovine mastitis because of its ease and speed of use, its effective dispersion into the milk system, and the simple means of applying the medication, under pressure, either in single or repeated doses. In this respect, there is provided a novel method of the treatment of bovine mastitis which involves injecting into the teat canal of bovine, under high pressure, single or repeated doses of a medicated aerosol preparation comprising a homogeneous suspension, solution or emulsion of one or more medicaments in a suitable fluid carrier and containing a propellant for discharging the medicament or medicaments, under pressure, into the diseased area.

The mode of treatment of the present invention has been found to be particularly effective in the treatment of bovine mastitis and is especially advantageous for this purpose because of the ease of application and speed of use. In addition, application of the medicated preparation, under high pressure, enables the medicament to penetrate deep into the udder to combat the infections which is often extremely difficult to achieve when application is made using conventional syringes, as with fluid compositions, or squeezable tubes in the case of ointments. Furthermore, the method of the present invention eliminates the need for massaging the udder to distribute the medicament where it does some good as is frequently necessary when treatment is made using conventional ointments. Still further, utilizing the method of this invention, there is appreciably less waste of active material than is encountered with the use of squeezable tubes, syringes and the like.

The aerosol preparations employed in the treatment of bovine mastitis comprise one or more medicaments, a suitable non-toxic carrier for said medicament, and a propellant. The medicament and carrier, together with any other agent that may be required, are placed in a pressure tight container, such as the bottles or cans now used for various foam preparations, and are charged with the propellant under the desired pressure. It will be readily appreciated by the art that with certain medicaments the propellant may, in addition to discharging the medicament under pressure, serve as a suitable carrier for the active ingredients, thereby eliminating the need for any additional carrier.

The medicament employed in the aerosol preparations should be substantially insoluble in the propellant system and is preferably insoluble in the carrier when the latter is employed. Illustrative of those medicaments which may be utilized include steroids such as prednisolone, dexamethasone, cortisone, hydrocortisone, prednisone and their derivatives, i.e., salts, esters or aldehydes; antibiotics, such as procaine penicillin G, neomycin, dihydrostreptomycin, streptomycin, kanamycin, novobiocin, tetracycline, oxytetracycline, chlortetracycline, polymixin, chloramphenicol, erythromycin and their salts or derivatives. However, any medicament which has heretofore been found effective against bovine mastitis may be utilized. It is preferred, however, to use one or more steroids or antibiotics or mixture thereof. The amount of medicament employed will, of course, vary depending upon the severity of the disease but, in general, those amounts which have heretofore been used for the treatment of bovine mastitis are suitable.

The carrier, when employed, should, of course, be acceptable for administration to bovines. In addition, when an oleaginous carrier is employed, it should be miscible with the propellant employed. Water, as well as mixtures of water and oleaginous materials which are readily dispersible in the propellant with or without the aid of co-solvents such as ethanol, glycine and propylene glycol, is a suitable carrier. However, oleaginous materials such as mineral oil, sesame oil and the like are preferred.

When an oleaginous material is employed in the preparations, either alone or in combination with water, it is preferred to also incorporate in such preparations a surfactant in an amount sufficient to render the oleaginous product water dispersible. A suitable amount may vary from about 1% to about 5% by weight of the preparation. Preferably, the surfactant is a non-ionic surface active agent. One suitable agent is Tween 65, a polyoxyethylene sorbitan tristearate. In addition to rendering the oleaginous product water dispersible, the surfactant also aids to promote better wetting of any of the insoluble active ingredients, thereby resulting in a superior dispersion of the particles during manufacture. Because of this latter effect, it is desirable to include such a surfactant in those preparations containing water or the propellant alone as the carrier when one or more of the medicaments is substantially insoluble in such system.

Where the preparations described above contain an insoluble medicament and are to be stored for prolonged periods prior to use, it is desirable to incorporate in such preparations from about 0.5% to about 3% by weight of a suspending agent. A suitable suspending agent which may be employed when water alone is employed as the carrier is sodium carboxymethyl cellulose. In those preparations which employ an oleaginous carrier, either alone or with water, particularly useful suspending agents include Plastibase, sesame oil with varying amounts of aluminum monostearate, and propylene glycol. Plastibase 30–W consists of a mixture of 30 grams of polyethylene in enough mineral oil to make 1,000 grams of product. Other Plastibases containing varying amounts of polyethylene in mineral oil may also be used.

Among the propellants which may be utilized in the above preparations are the fluorinated or fluorchlorinated saturated hydrocarbons. The preferred propellants of this type are the halogenated alkanes containing not more than two carbon atoms and at least one fluorine atom. Illustrative of these are trichloromonofluormethane, dichlorodifluoromethane, monochlorotrifluoromethane, dichloromonofluoromethane and 1,2-dichloro-1,1,2,2-tetrafluoroethane. These compounds are available commercially under the trade name "Freon." The prime use of the propellant is as the propelling force which ejects the preparation from within the container. Once ejection of the product is effected, the propellant expands in the udder, thereby distending the duct network in the udder and thereby allowing a more thorough penetration and distribution of the medicament therein. Accordingly, it is essential for this purpose that the above-mentioned propellants, when employed alone or in compatible admixtures, have a vapor pressure of at least 20 pounds and preferably 25 to 70 pounds per square inch gauge at 70° F. To illustrate, dichlorodifluoromethane, which has a vapor pressure of about 70 pounds per square inch gauge, may be used alone or mixed with 1,2-dichloro-1,1,2,2-tetrafluoroethane, with a vapor pressure of about 13 pounds per square inch gauge at 70° F., in various preparations to form a propellant having a vapor pressure within the prescribed limits.

In addition to the above-mentioned propellants, any other propellant or mixtures thereof with the above or other propellants which are non-toxic and have the required vapor pressure, may be utilized. Thus, for example, isobutane, octafluorocyclobutane, and various mixtures thereof, may suitably be employed. Similarly, inert gases such as carbon dioxide, nitrogen and the like may be employed.

The amount of propellant employed in the preparation is dependent upon the nature of the preparation and the amount of material to be dispensed from the container. In general, with those propellants having a vapor pressure in the range specified hereinabove, the propellant will generally comprise from about 5 to about 90% by weight of the total material in the pressured container. Where inert gases are employed, an amount sufficient to produce, within the container, a pressure of about 90 to 110 pounds per square inch gauge is generally adequate.

The following examples are included for the purpose of illustration and are not to be construed as any undue limitation of the scope of the appended claims.

*Example 1*

A foam preparation which is suitable for the treatment of bovine mastitis and may be administered by the method of this invention is prepared as follows.

The following representative medicaments in amounts to form a normal ten percent manufacturing overage are blended, milled and reblended:

Prednisolone - 21 - phosphate disodium—an equivalent weight to give 12.6 mg. of free acid per gram of preblend;
Procaine Penicillin G—an equivalent weight to give 252,500 units per gram of preblend;
Neomycin sulfate—an equivalent weight to give 252.5 mg. of neomycin base per gram of preblend; and
Dihydrostreptomycin sulfate—an equivalent weight to give 252.5 mg. of dihydrostreptomycin base per gram of preblend.

The oleaginous carrier or base is prepared from the following:

|  | Gm. |
|---|---|
| Plastibase 30–W | 0.55 |
| Tween 65 | 0.05 |
| Mineral oil, heavy | 0.40 |
|  | 1.00 |

The mineral oil is heated in order to dissolve the Tween 65, and the product is allowed to cool below 30° C. The Plastibase 30–W is then thoroughly blended with the mixture.

The preblend of active medicaments and carrier or base are mixed together in the proportions:

|  | Gm. |
|---|---|
| Preblend of medicaments | 0.249 |
| Oleaginous carrier | 0.751 |
|  | 1.000 |

The preblend, which is a powder, is incorporated into one-half the base with thorough mixing, and is then passed through an 80 mesh screen. The screen is flushed with the remainder of the carrier. The two portions are then thoroughly mixed and the batch is again passed through the screen. The product is stored under nitrogen until used or packaged.

The mixture of preblend and carrier which may be designated as the "aerosol concentrate" and Freon 12 are packaged in the following proportions:

|  | Gm. |
|---|---|
| Aerosol concentrate | 0.835 |
| Freon 12 (dichlorodifluoromethane) | 0.165 |
|  | 1.000 |

The actual loading of the pressurized package is governed by the commercial equipment available. Pressure loading of the package seems to be the most applicable although a modified refrigeration method may be used.

The foregoing proportions of materials were selected to form a preparation as follows for administering a 2.1 gram dose:

| Prednisolone-21-phosphate | 5 mg. |
|---|---|
| Procaine Penicillin G | 100,000 units. |
| Neomycin base | 100 mg. |
| Dihydrostreptomycin base | 100 mg. |
| Plastibase 30–W | 734 mg. approximately. |
| Tween 65 | 66 mg. approximately. |
| Mineral oil, heavy | 526 mg. approximately. |
| Freon 12 | 347 mg. |

It is, of course, to be understood that other proportions may be selected to provide different doses, and that different combinations of the steroids and antibiotics may be used.

When the pressure-fill method is used, the concentrate is charged into the container which is flushed with some of the propellant to remove air and the valve is crimped into position. The Freon 12 is then charged into the container under pressure. Then the container is heated to about 130° C. to check for evidence of container distortion, and other defects such as leakage. The pressure within the container is important since it regulates the amount and consistency of the foam produced. But since there is a close relationship between the pressure and carrier consistency related to the type of foam produced, it is difficult to place limits on internal pressures. However, limits may be established for the pressure as related to the size and type of container used.

The following is a list of containers that may be used for containing and administering the preparations of the invention.

A. Glass containers: Any glass container, coated or otherwise, which does not exceed 2 inches in outside diameter nor 4 fluid ounces in capacity as exemplified by Wheaton's Coated 2½ oz. glass aerosol bottle, etc.

B. Metal containers:
  (1) The White Metal Mfg. Co.'s can made of extruded aluminum with a capacity of 2¾ oz., lacquer lined and necked for a 1" valve (size 1½" x 3½").
  (2) The Peerless Tube Co.'s can made of extruded aluminum with a capacity of 2¼ oz., lacquer lined and necked for a 1" valve (size 1⅜" x 3 13/16").
  (3) American Can Co.'s container, 202 x 214 round domed 0.50 electrolytic tinplate throughout, side seam soldered outside, top and bottom compound lined and double seamed, sides lacquer lined.

The valves with which the containers are fitted are of special interest. The following valves are suitable for the purposes of this invention.

A. Glass:
   Risdon's valve Model 5597 GB
   Risdon's valve Model 4935 GB
   Risdon's valve Model 5883-2.5
   Precision's valve Model 6B or equivalent precision metering valves for glass bottles.
B. Standard 1" cup valves of metal:
   Clayton Mfg. Co.'s valve for foam products, model depending on use of dip tube
   V.C.A.s' all stainless steel foam valve
   Any other foam valve with a standard 1" cup.

The type of actuator for administering the preparation into an udder in one which can best be adapted to take a removable cannula type applicator, such as an open end milking tube having an opening somewhere between 10–13 gauge. The ideal valve for treating bovine mastitis would be a metering valve capable of delivering 5 grams of material with 3 to 5 activations to insure correct dosage. The actuator cannula, model No. 5883–EV–1 of the Risdon Manufacturing Co., Naugatuck, Connecticut, is a very effective dose administration means.

*Example 2*

A number of milking cows infected with bovine mastitis in one or more sections of the udder were treated by injecting into the teat canal by means of a cannula, a preparation made in accordance with Example 1 in 5 gram doses, each dose containing:

Prednisolone-21-phosphate triethylamine, equivalent to 5 mg. of prednisolone-21-phosphate;
Neomycin sulfate, equivalent to 100 mg. of the base;
Dihydrostreptomycin sulfate, equivalent to 100 mg. of the base;
Procaine Penicillin G, equivalent to 100,000 units;
Liquid petrolatum U.S.P. (mineral oil) 1.84 gm.; and
Tween 65, approximately 0.23 gm.
Plastibase 30–W, approximately 2.52 gm.
Freon 12, approximately 0.815 gm.

All cases were diagnosed, treated and examined after treatment by veterinarians. In some instances pronounced improvement was found after one dose. In other instances the condition of the cow was reported to be normal after two or three doses, each dose repeated daily.

*Example 3*

A two-year old heifer weighing 950 pounds which was fresh 48 hours and giving 8 pounds of milk per milking developed acute mastitis in the right hind udder which was firm and tender. This quarter was injected with one dose of the preparation of Example 2 on three successive days and the left-hind and right-front quarters were injected once on the first day. Seven days later, the treated quarters were much softer, secretion was normal, and the milk production was now 9 pounds per milking.

*Example 4*

A five-year old cow weighing 950 pounds having chronic mastitis in both left quarters and giving flaky milk was treated with the preparation described in Example 2. On two successive days one 5 gram dose was injected into the teat canal of the affected quarters. Thirty-six hours after the second injection both quarters secreted normal milk, and the cow was reported to be in good condition.

*Example 5*

Various mastitis preparations suitable for administration by the method of this invention are prepared as follows The following representative medicaments in amounts set forth below are blended, milled, and reblended:

|  | Gms. |
|---|---|
| Procaine Penicillin G | 57.89 |
| Dihydrostreptomycin sulfate | 75.28 |
| Neomycin sulfate | 80.52 |
| Prednisolone-21-phosphate disodium | 3.54 |

Employing the above blend, the following preparations are prepared:

A. 39 grams of the blend is thoroughly mixed with 27.54 cc. of sesame oil and 76.50 cc. of distilled water. 25.5 cc. of this mixture is transferred to a suitable container to which is added, under pressure, 45 cc. of Freon 12.
B. To 39 grams of the blend is added 76.50 cc. of water. 25.5 cc. of the aqueous mixture is transferred to a suitable container to which is added, under pressure, 4.5 cc. of Freon 12.
C. 39 grams of the blend is thoroughly mixed with 90 cc. of sesame oil. 25.5 cc. of the resulting mixture is transferred to a suitable container to which is added, under pressure, 4.5 cc. of Freon 12.
D. To 13 grams of the blend in a suitable container is added, under pressure, Freon 12 to make 30 cc.

In each of the above preparations A, B, C, and D, a 2.5 cc. dose will contain 100 mg. of Procaine Penicillin G, 100 mg. of Neomycin, 100 mg. of Dihydrostreptomycin and 5 mg. of prednisolone-21-phosphate.

Various changes and modifications of this invention can be made and to the extent that such variations incorporate the spirit of this invention, they are intended to be included within the scope of the appended claim.

This application is a continuation-in-part of our copending application, Serial No. 833,991, filed August 17, 1959, now abandoned.

We claim:

In the method of treating bovine mastitis which involves injecting into the milk duct system of bovines infected with mastitis, a surfactant-stabilized liquid foam base preparation comprising a mixture of an anti-mastitis medicament and a non-toxic aerosol propellant, under pressure, whereby there is penetration of the medicated foam deep into the udder, the step which consists essentially of infusing into said milk duct system of the udder of an infected host a self-propelling milk-miscible, non-aqueous, surfactant-stabilized oleaginous liquid foam composition containing an anti-mastitis medicament and a non-toxic aerosol propellant, said propellant being capable of exerting sufficient pressure to expel said milk-miscible, non-aqueous oleaginous foam and medicament into said milk duct system and into the mucuous membranes thereof.

References Cited in the file of this patent

UNITED STATES PATENTS

| 2,954,935 | Stearns et al. | Oct. 4, 1960 |
| 3,014,844 | Thiel et al. | Dec. 26, 1961 |

OTHER REFERENCES

Merck Veterinary Manual (1955), Merck & Co., Rahway, N.J.; pages 48–61, Mastitis, and Miscellaneous Diseases of the Bovine Udder; pages 479–583, Adrenocortical and Related Therapy; pages 1300–1305, Tests for Mastitis.

"Animal Diseases," 1956 Yearbook of Agriculture, U.S. Dept. of Agriculture, U.S. Govt. Printing Office, Wash, D.C; pages 94–96, Veterinary Antibiotics; pages 245–250, Bovine Mastitis, Therapy; pages 250–255, Adrenocortical Drug Therapy in Dairy Cattle; pages 292–298, Sarcoptic Mange Mastitis, Therapy in Cattle; page 384, Swine Mastitis, Therapy; pages 433–434, Sheep Mastitis, Therapy Zimmerman: A.M.A. Archives of Dermatology, vol. 79, pp. 1–6, January 1959.